United States Patent Office 2,805,807
Patented Sept. 10, 1957

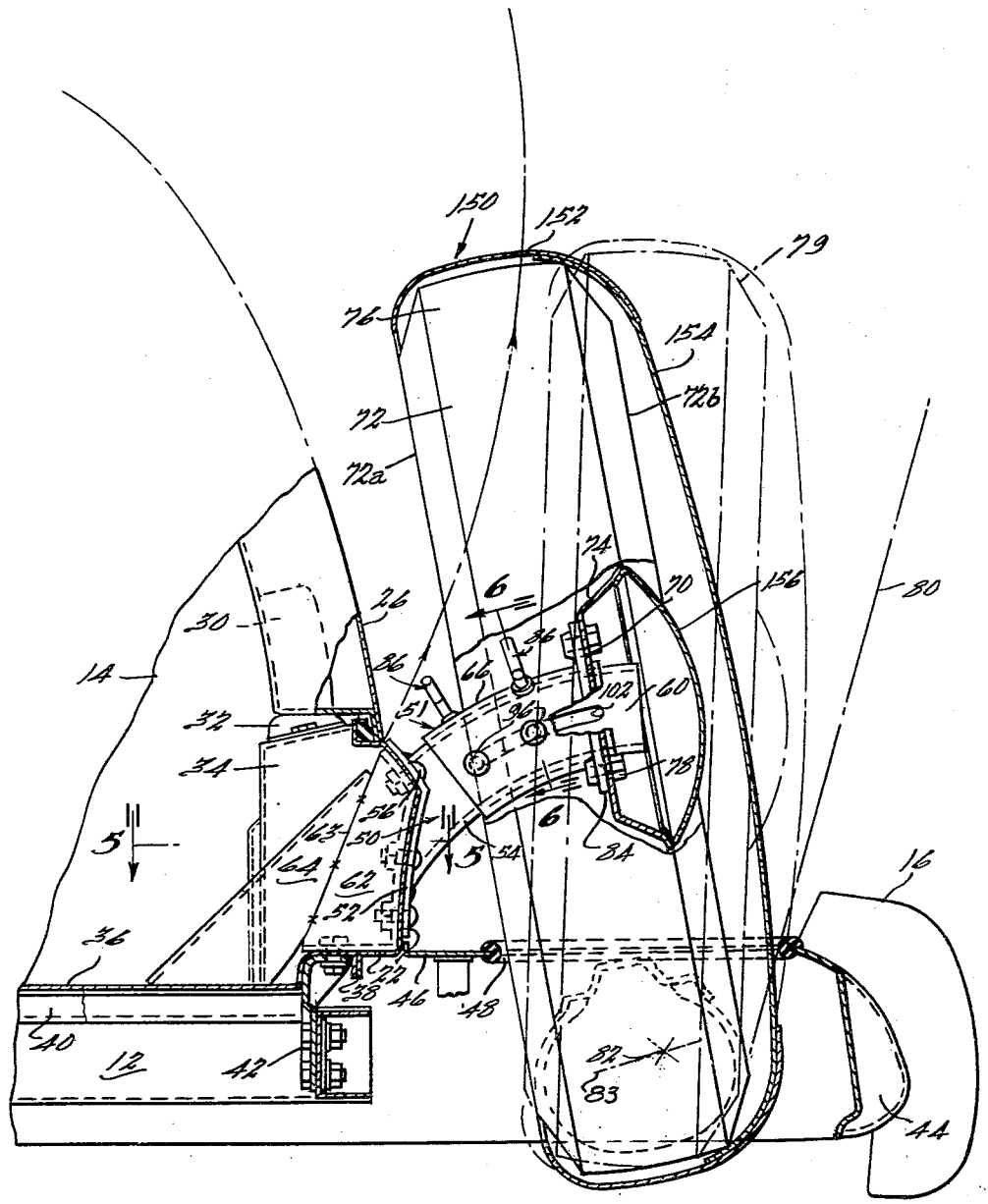

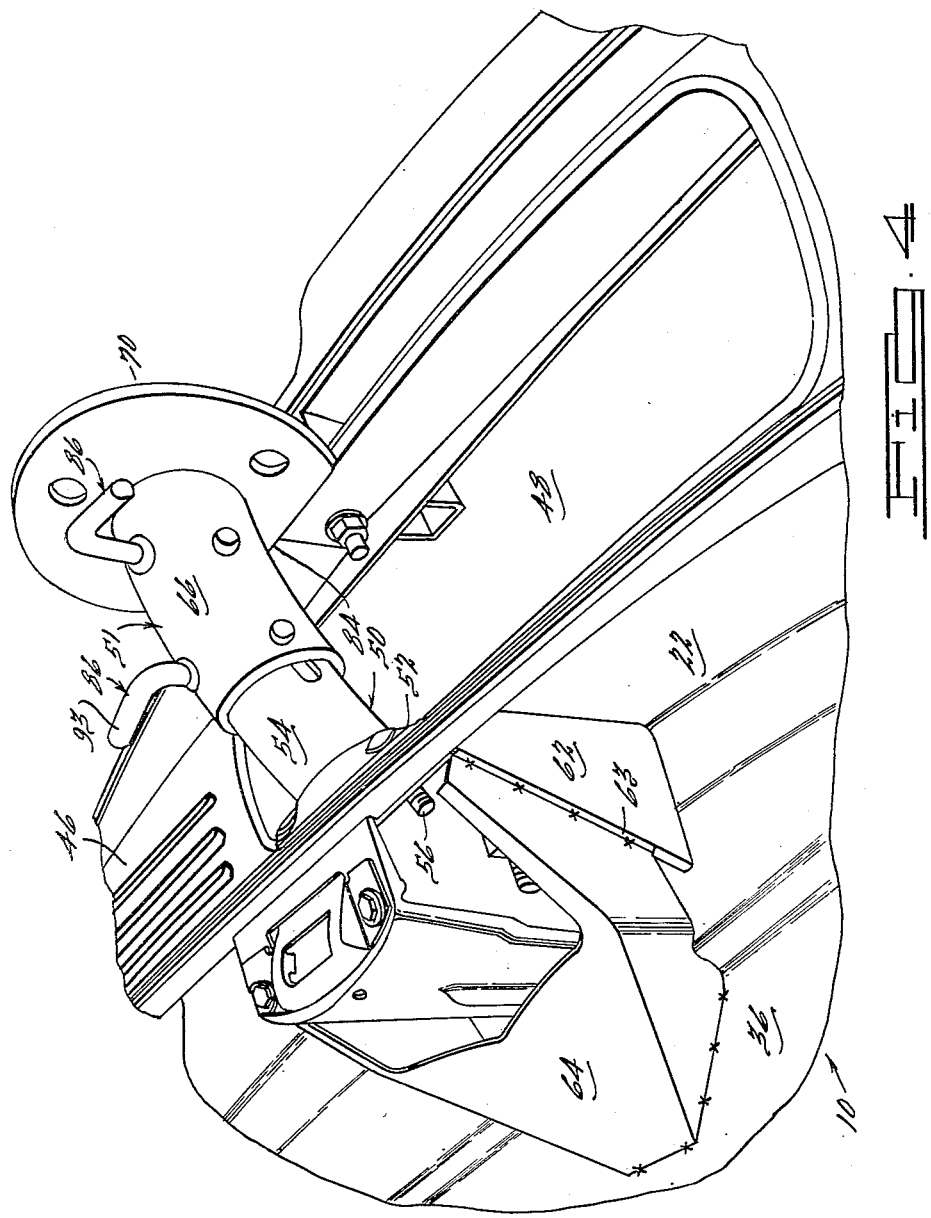

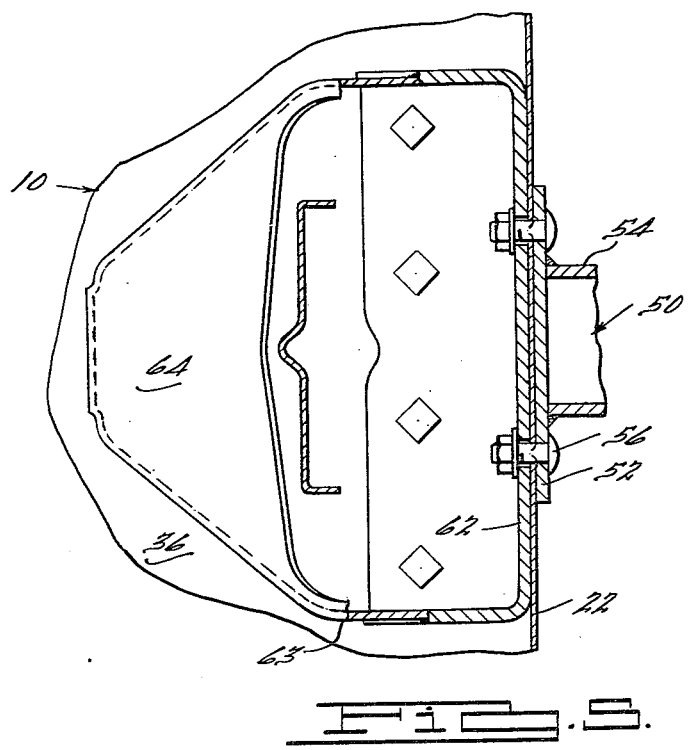
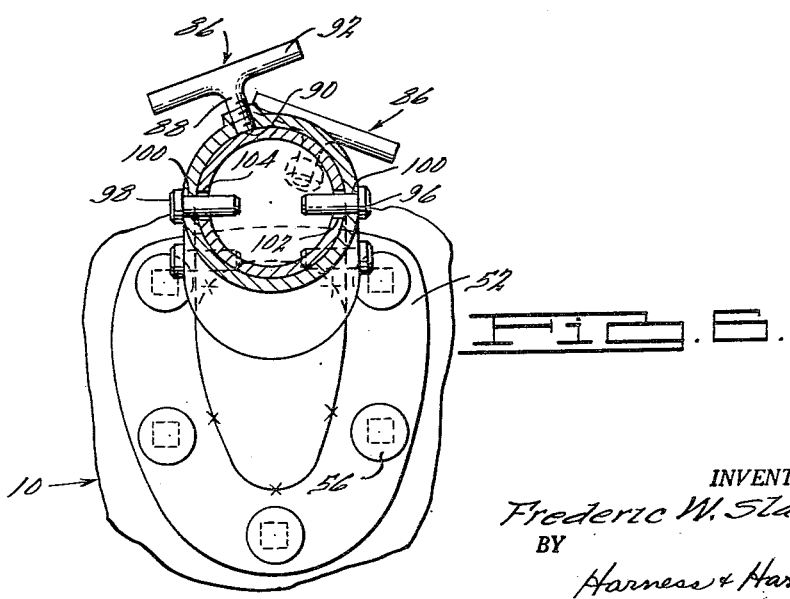

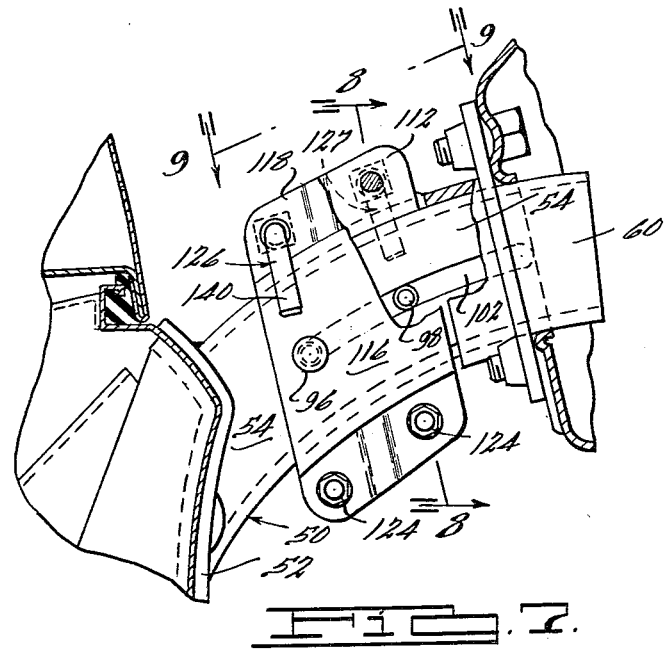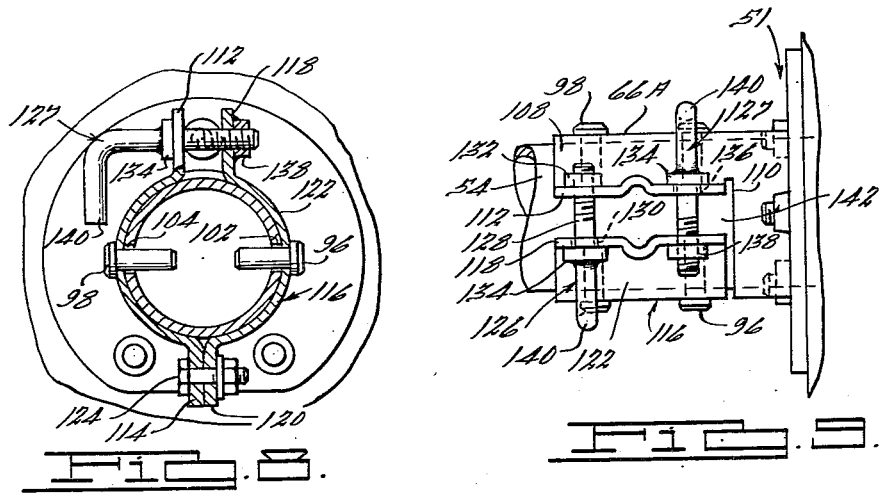

2,805,807

CONTINENTAL SPARE TIRE MOUNTING

Frederic W. Slack, Grosse Pointe Farms, Mich., assignor to Chrysler Corporation, Highland Park, Mich., a corporation of Delaware Application January 13, 1954, Serial No. 403,708

13 Claims. (Cl. 224—42.21)

This invention relates to a so-called "Continental" spare tire mounting and to an arrangement for securing the same to a vehicle structure.

By a "Continental" spare tire mounting, I have reference to one where the spare tire is mounted at the rear of the vehicle adjacent to and outside the trunk or baggage compartment for the purpose of securing additional storage space in the compartment and as a styling feature. It will be understood that a "Continental" spare tire mounting is desirable for the latter purpose in that it gives a sporty appearance to the vehicle of which it forms a part and makes the vehicle appear of considerably greater length than its actual dimension.

In providing a tire mounting of the foregoing character on a vehicle, it is desirable to have the tire in a recess or well intermediate the trunk compartment and rear bumper structure of the vehicle. Moreover, the relationship is materially enhanced from the standpoint of appearance where the top portion of the tire is arranged in its normal position to lean forwardly. Furthermore it is desirable that the tire be as close as possible to the trunk compartment to eliminate excessive overhang of the rear bumper structure.

However, because of the stated relationship between the tire and the trunk compartment, it is necessary to provide a mounting arrangement permitting the trunk lid to be opened without interference with the tire. Mounting the tire on the trunk lid is not practical. Moreover, complicated hinging and locking devices heretofore proposed for enabling shift of the tire to permit opening of the trunk lid have been expensive, lack rigidity, and were susceptible to rattle.

I have discovered that a practical and effective spare tire mounting of the "Continental" type may be obtained that will provide all the aforesaid desirable features. This may be accomplished, for example, by attaching to the rear structure of the vehicle below the trunk lid of the trunk compartment, a suitable hanger provided with an extension of peg-like character on which to support and fasten a second or tire carrying member movable relatively thereto lengthwise of the extension. The extension is preferably shaped to form a path of changing direction for instance, a smooth continuous curve and further provided with an upward and outward direction. As thus constructed, the tire carrying member will be positioned on the hanger extension in a manner permitting the tire in its normal position to be inclined forwardly with its lower end received between the body and bumper structure and such that the tire carrying member may be easily moved outwardly on the extension and in effect cause the upper part of the tire to be swung or tipped rearwardly from its normal closed position to one where it will clear the trunk lid when it is opened and permit handling of baggage without substantial inconvenience.

Moreover, I have discovered that if the shaping of the extension of the hanger be substantially coincident with a path having its focus within the tire receiving recess between the body and bumper, for example, a path with a radius having as its center a point within the cross section of the tire casing at its lowest point, preferably on a line through the approximate mid point of this section, the upper portion of the tire may be readily moved the requisite amount to provide swing clearance for the trunk lid and to a desired rearwardly inclined position making easy access to the trunk compartment feasible, all this without causing the bottom portion of the tire to move substantially in a horizontal direction from its normal position, i. e., its position of rest when the lid is closed. This permits the lower portion of the tire to be located close to the body at all times, and makes it unnecessary for the bumper to be moved further back from the body of the vehicle than if the tire had remained in a stationary predetermined location at all times. Furthermore, if a stone shield is provided in the space between the body and the bumper, the opening or recess necessary therein through which to receive the tire will be of a minimum size.

Accordingly, it is a principal object of my invention to provide a "Continental" type spare tire mounting of simple and rugged character that will permit the tire to be located as close as possible to the trunk compartment when the vehicle is in motion (i. e., the normal position of the tire) and in a forwardly inclined position, but which may without great effort be readily tipped, swung or moved rearwardly to a second temporary or permanent position facilitating opening of the trunk lid past the tire mounting and handling of luggage in the trunk compartment.

Another object is to provide a spare tire mounting of the foregoing character which is suitably and rigidly anchored to the vehicle structure and that will not be susceptible to rattle.

A further object is to provide a spare tire mounting of the foregoing character wherein the tire may be swung from its normal position away from the vehicle body and about a center located at the approximate mid portion of the cross section of the tire casing at its lowest point so as to permit a substantial rearward movement of the upper portion of the tire without causing the bottom of the tire to substantially move rearwardly from its normal position.

Still another object is to provide a "Continental" type spare tire mounting wherein the tire may be normally positioned in a forwardly tipped relation close to the rear portion of the vehicle body and with its lower end between the body and bumper yet may be swung to a rearwardly tipped position to permit swing-by of the trunk lid and ready access to luggage in the trunk compartment and while utilizing a minimum of space between the vehicle body and the bumper.

It is another object of my invention to provide a "Continental" type spare tire mounting of the foregoing character wherein the tire may be releasably held in its normal position and in its position permitting opening of the trunk lid and removal of baggage.

These and other objects and advantages of my invention will be more apparent from the following description taken in conjunction with the accompanying drawings wherein I have illustrated a preferred embodiment of my invention.

In the drawings:

Figure 3 is a side elevational view partly in section showing the preferred form of construction of the spare tire mounting of my invention with the parts in their "normal" position and showing the manner of applying my invention to the rear portion of a vehicle body, this figure also showing in phantom the position of the tire providing swing clearance for the trunk lid;

Figure 4 is an elevational view in perspective showing the structure of Figure 3;

Figure 5 is a cross sectional plan view taken at AA of Figure 3 and illustrating one manner of reinforcing the hanger member of my invention;

Figure 6 is a cross sectional view taken at BB of Figure 3 showing the guide and stop arrangement for the tire carrying member of my invention and the manner of releasably clamping the same to the hanger;

Figure 7 is an elevational view partly in section illustrating a modified form of clamping structure as applied to the tire mounting of my invention;

Figure 8 is a cross sectional view taken generally at CC of Figure 6; and

Figure 9 is a plan view looking down on the structure shown in Figure 6 in the direction of the arrows D—D.

Figure 1:
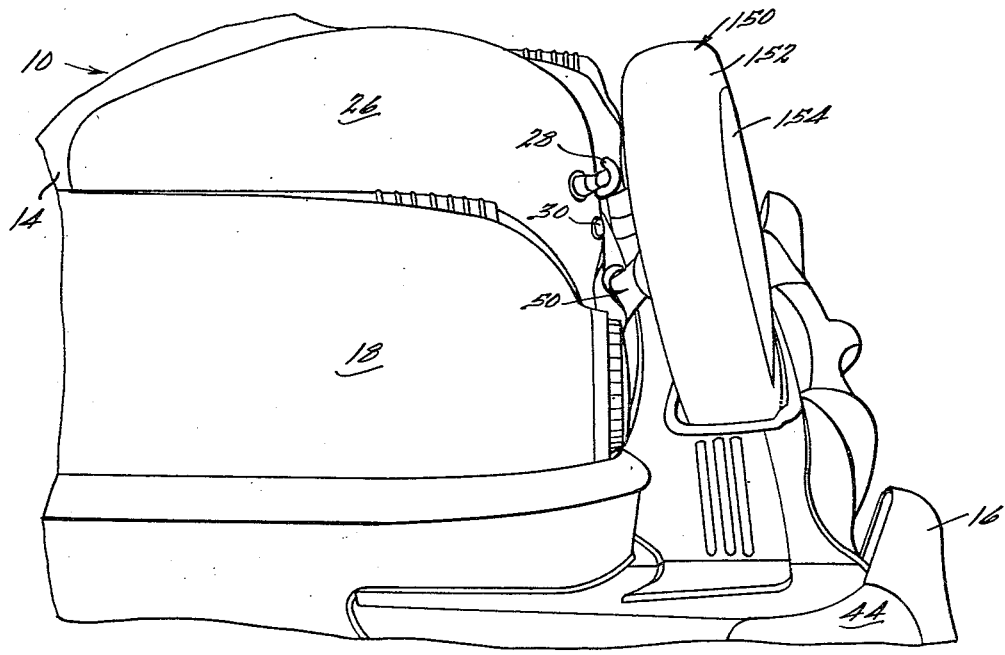
Figure 1 is a side elevational view of a vehicle in perspective, showing the spare tire mounting of my invention as applied to the rear part thereof and illustrating the tire in its forwardly inclined position for normal driving of the vehicle.

Referring now to the drawings wherein similar numerals are used to designate similar parts of the structure, the numeral 10 generally represents an automotive vehicle provided with a frame 12 (Figure 3) on which is supported a body assembly 14 and a rear bumper assembly 16 spaced rearwardly from the body. The manner of supporting these assemblies is well known and forms no part of this invention.

Figure 2:
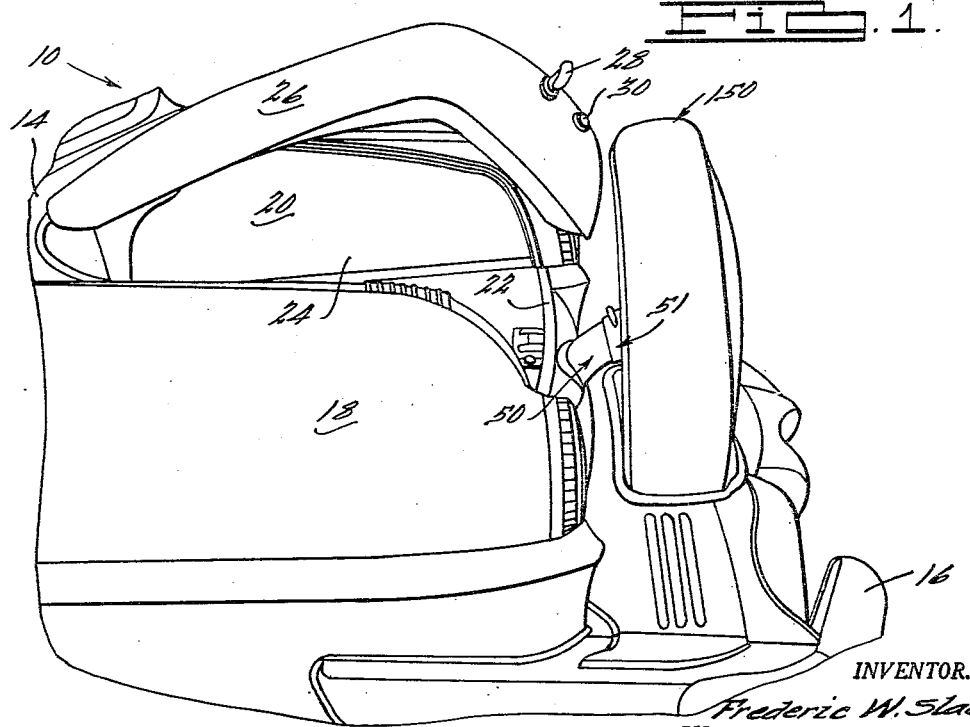
Figure 2 is a similar view to that in Figure 1 but showing the tire swung to its rearwardly inclined position providing swing clearance for an open trunk lid.

The body assembly includes rear side quarter panels 18 and 20 (see Figures 1 and 2) and a rear panel 22 defining a trunk compartment 24 closed by hinged trunk or deck lid 26 having a handle 28 controlling a lock 30 whose catch is operable relative to a keeper 32 carried by a bracket 34 connected with the rear panel 22.

The compartment 24 includes a floor deck 36 connected at 38 with the rear panel 22 and stiffened by transversely spaced elongated longitudinal stiffening elements 40 carried by a bracket 42 connected to the frame 12.

The bumper assembly 16 includes a wrap-around bumper 44 connected to the frame by suitable brackets, not shown, which also support a stone shield 46 arranged between the rear body section 22 and the bumper 44.

As previously pointed out, the "Continental" spare tire mounting of my invention is not only intended to permit the tire in its normal position to be inclined forwardly of the body but is also intended to enhance the overall appearance of the vehicle, and utilize a minimum of space between the body and the bumper assembly.

This result is desirably obtained by securing the tire mounting of my invention to the rear panel 22 of the body and permitting the lower portion of the spare tire to extend into the space between the body section 22 and the bumper assembly 16 through a recess 48 in the stone shield 46.

The spare tire mounting of my invention, as seen in Figures 3 to 6 for example, preferably comprises a hanger member generally designated by the numeral 50 and a tire carrying member generally referred to by the numeral 51. The hanger 50 is provided with a base portion 52 and a peg-like extension or element 54 extending upwardly and outwardly from the base 52. As seen in Figure 3, the base portion 52 may be desirably constituted of a steel plate conforming to the shape of the rear body section 22 and secured thereto as by bolts 56, and the extension 54 is preferably constituted of a tubular steel member welded to the base 52. As seen in Figure 3, the tube 54 has a curved or bent shape forming in effect a hook or peg relative to the base 52. The curvature of the extension 54 is preferably smooth and continuous such that its axis designates a path of changing direction beginning at its connection with the base 52 and ending at its outward tip 60. This curvature is an important feature of the invention and will be hereinafter evident. The extension also extends upwardly and outwardly and its outer end is preferably the highest point of the hanger.

In order to securely mount the hanger 50 and render it free of rattle and vibration, the rear deck panel 22 at the position of mounting of the hanger is reinforced by a bracket 62 of generally U section to which as at 63 is welded a further U sectioned member 64 inverted relative to the bracket 62 and recessed to conform to the bracket 34 and which in turn anchors the reinforcing member 62 to the floor deck 36 as by welding thereto.

Received over the projection 54 of the hanger 50 so as to telescope therewith and slide thereon, is a tubular portion 66 of the tire carrying member 51 which loosely fits the projection 54 and is shaped to conform to the curvature of the projection 54. The tire carrying member also includes a flange portion 70 at the outer end of the portion 66 upon which a tire 72 may be supported through a conventional hub 74 on which the casing 76 of the tire is mounted. The tire 72 has a forward side 72a and a rearward side 72b. The usual bolts 78 secure the hub 74 to the flange 70.

As will be evident from Figure 3, the tire carrying member 51 is readily slidable upon the projection 54 of the hanger and may be positioned thereon such that the tire in its normal position, shown in the full lines in Figure 3, is forwardly inclined with respect to the body. Moreover, it may be moved outwardly, for example, to the position shown in phantom in Figure 3 where the trunk compartment lid 26 and its handle 28 may be swung past the tire without difficulty to permit access to the trunk compartment. The tire may, of course, be shifted further outwardly, as will be evident from the dot and dash line 80 in Figure 3 if such is desirable.

As described above, the longitudinal curvature of the hanger projection 54 and of the tire carrying tubular section 66 is preferably selected to provide a radius of curvature whose center is approximately at a point 82 on a line 83 through the mid point of the tire casing section. This is an important feature where the tire is located to project through the stone shield in a position intermediate the vehicle body and the bumper bar 44 and where a minimum overhang of the bumper is desired. If the projection 54 were straight, it will be evident from Figure 3 that a large recess would be necessary in the stone shield 48 to accommodate movement of the tire to clear the trunk lid and the bumper 44 would necessarily be positioned further distant from the body than shown in that figure. By selecting the center of curvature, as described, it becomes possible to shift the tire on the projection 54 from the normal position to the trunk lid clearing position 79 shown in phantom in Figure 3 or the extreme position 80 while substantially maintaining the lower portion of the tire, relatively speaking, in its normal position, with respect to the surrounding structure. The actual change in position of the tire in the plane of the stone shield as will be evident from Figure 3, is very small and hence the size of the opening 48 in the stone shield 46 required for clearing the tire is very little larger than the space occupied by the tire in that plane and this makes for a very neat appearing construction, as will be evident from Figures 1 and 2.

In order to facilitate complete removal of the tire from the tire carrier 51 and the well created by the opening 48 in the stone shield and replacement thereof, the lower portion of the flange 70 of the tire carrying member 51 is preferably cut off generally horizontally tangent to the surface of the tubular portion 66 as at 84. This provides greater space between the outer rubber protected edge 85 of the recess 48 and the tire carrier 51 in which to manipulate the tire.

The tire carrying member 51 is preferably retained in its normal position or in its positions 79 and 80 clearing the trunk compartment lid 26 by suitable means providing for clamping or locking of the tubular portion 66 to the extension 54. Such may, for example, comprise one or more clamping set screws 86, two being shown in Figures 3, 4, and 6 spaced longitudinally of the tubular member 66 and spaced circumferentially thereof. In Figure 3 these clamping members 86 are of T shape and in Figure 4 of L shape, either type comprising a threaded stem 88 having a tapered tip 90 and provided with a cross member or handle 92 (Figure 6) or 93 (Figure 4) of sufficient length to provide an adequate hand grip for the same. These members are received in threaded holes of sufficient length in the tubular member 66.

In view of the curvature of the telescoping elements 54, 66, it will be apparent that there is little, if any, likelihood of rotary movement of the tire carrier. In some instances it may be desirable to provide independent or additional guiding means for the tire carrier or stop means at the opposite extreme limits of positioning of the tire carrier, the former to prevent a monkey-on-the-stick action in shifting the tire carrier. These features may both be provided, as seen in Figure 3, by a pin and slot arrangement between the telescoping elements 54 and 66. Figures 3 and 6 show a preferred arrangement utilizing a pair of headed pins 96 spaced apart on the curved axes of the tubular element 66, on one side of the latter and a second pair of pins 98 diametrically opposed to the first mentioned pair. These pins are fitted with a drive fit in openings 100 in the wall of the element 66 and may also be welded thereto. By preference, these pins will be positioned in transverse alignment with the respective clamping screws 86. The pins 96, 98 will respectively engage and project through similar elongated curved slots or recesses 102, 104 on the wall of extension 54, these slots being preferably on the axis of the extension 54 and concentric with the curvature of this element. The slots 102, 104 will have a length to satisfy the desired change in position of the tire between its normal position when driving the vehicle and its furthest outward positions 79 or 80 as may be desired, the pins 96, 98 abutting the ends of these slots at the extreme positions of the carrier 51. In addition to serving as limit stops, the pin and slot arrangement will prevent binding of the telescoping members in use and will also prevent complete disassembly of the telescoping members by the vehicle driver. If desired, rollers (not shown) may be provided on the pins 91, 98 to roll in the slots 102, 104.

In Figures 7 to 9 I have shown a modified form of clamping means wherein the inward portion 108 of the tubular section 66A of the tire carrying member 51 is circumferentially slotted as by a transverse slot 110 and the circumferential portion along the slot 110 formed by suitable cuts and bends into opposite outwardly projecting lips or flanges 112, 114 on which to support a spring clamp or cap 116 having similar opposite lips 118, 120 respectively and having an intermediate portion 122 conforming in shape to the extension 54.

As seen in Figure 8 the lips 114, 120 are bolted in face-to-face relationship by spaced bolts 124. The opposite lips 112, 118 on the other hand are spaced apart and a pair of suitable hand clamp screw members 126, 127 shown in Figures 7 and 8 to be of L shape, are provided to draw the cap 116 toward the portion 108 of the member 66A and against the extension 54 to clamp the member 66A in position. One of these clamp screws 126 has its threaded shank 128 passed through a clearance opening 130 in the flange 118 of the cap 116 and recessed in a threaded protuberance 132 on the flange 112 of the member 66A and which may be a nut welded thereto and the screw is further provided with a shoulder portion 134 which bears against the flange 118 when the screw 126 is drawn up.

A similar clamp screw 127 has its threaded shank 128 passed through a clearance opening 136 in the flange 112 and received in a threaded protuberance 138 of the flange 118, the shoulder portion 134 of this screw bearing against the flange 112. As shown, the handle or hand grip portions 140 of the screws 126, 127 are on opposite sides of the space 142 between the flanges 112, 118. This provides greater accessibility for the operator's hands in operation. By adequate spacing of the screws it will be understood that the grip portions may be located on the same side of the space 142. Tightening of the clamp screws 126, 127 will cause the cap 116 to flex and bear against the surface of the projection 54 and bind the latter between the portion 122 and the portion 108 of the carrier 51 to hold the tire carrier in a fixed position on the extension 54 of the hanger 50.

The modification in Figures 7–9 may be provided with suitable guide and stop means, for instance, a pin and slot arrangement such as described with respect to Figures 3 and 6 located horizontally on the axis of the extension 54. In that event the spaced pins 96 will be secured on the cap 116 which it will be noted is held in position by the bolts 124 and the spaced pins 98 will be secured on the portion 108 of the member 66A. The pins 96 and 98 respectively will interengage slots 102, 104 respectively on the extension 54, these slots extending outwardly of the pins in Figure 7 a sufficient distance to accommodate the necessary movement of the tire carrier 51.

In order to enhance the appearance of the tire carrying mounting, I may provide for an external metal covering for the tire 72, generally designated by the numeral 150 and which comprises a split ring element 152 of spring-like character which may be snapped over the tire when in position, and an end disc 154 interfitting therewith which may cover the outer side of the tire immediately opposite the tire hub cap 156. This shield or cover forms no part of my invention and may be of conventional construction.

Although I have described a preferred embodiment of my invention, it will be understood that various changes in the structure thereof may be made without departing from the novel features thereof. For example, in some cases in a construction as in Figure 3, it may be desirable to have the section 66 of the tire carrying member slidably received within the projection 54 rather than externally thereof as illustrated in Figure 3. Moreover, knurled or other hand wheel type of clamp screws may be employed in lieu of the T-shaped, L-shaped members shown. Moreover, other forms of guide and stop means will be readily evident to those skilled in the art. Accordingly, such other modifications are intended to be included within the scope of my invention.

I claim:

1. In a vehicle having a body including a rear compartment having an upwardly swingable lid and having a bumper structure spaced rearwardly of the body providing a recess between it and said bumper into which the lower end of a spare tire may be received; a mounting for supporting said tire in a generally vertical position in said recess and adapted to facilitate movement of the tire about its lower portion from a forward position with its inner side in juxtaposition to said lid to a rearward position permitting swing clearance for said lid and while substantially retaining the lower portion of the tire in substantially the same relative position fore and aft of the said bumper and body respectively, said mounting comprising a hanger element rigidly secured to said body and projecting rearwardly and upwardly therefrom between said body and said inner side of said tire and a tire carrying member in telescoping relationship to said hanger element and said element having a shape such that said member is movable rearwardly relative to said hanger element along a path of changing direction having its focus within said recess whereby to effect the aforesaid tire positioning.

2. In a vehicle having a body including a rear compartment having an upwardly swingable lid and having a bumper structure spaced rearwardly of the body providing a recess between it and said bumper into which the lower end of a spare tire may be received, a mounting for supporting said tire in a generally vertical position in said recess and adapted to facilitate movement of the tire about its lower portion from a forward position with its inner side in juxtaposition to said lid to a rearward position permitting swing clearance for said lid and while substantially retaining the lower portion of the tire in substantially the same relative position fore and aft of said bumper and body respectively, said mounting comprising a hanger element rigidly secured to said body below said lid and projecting rearwardly and upwardly therefrom between said body and said inner side of said tire and a tire carrying member slidable on said hanger element away from said body along a path of changing direction provided by said hanger element and having its focus within said recess whereby to effect the aforesaid positioning of said tire.

3. In a vehicle having a body including a rear compartment having an upwardly swingable lid and having a bumper structure spaced rearwardly of the body providing a recess between it and said bumper into which the lower end of a spare tire may be received, a mounting for supporting said tire in a generally vertical position in said recess and adapted to facilitate movement of the tire about its lower portion from a forwardly inclined position with its inner side in juxtaposition to said lid to a rearward position permitting swing clearance for said lid and while substantially retaining the lower portion of the tire in substantially the same relative position fore and aft of said bumper and body respectively, said mounting comprising a hanger element rigidly secured to said body below said lid and projecting rearwardly and upwardly therefrom between said body and said inner side of said tire and a tire carrying member slidable on said hanger element away from said body along a path of changing direction provided by said hanger element and having its focus within said recess whereby to effect the aforesaid positioning of said tire and releasable means for holding said tire carrying member in a predetermined position along said hanger element.

4. In a vehicle having a body including a rear compartment having an upwardly swingable lid and having a bumper structure spaced rearwardly of the body providing a recess between it and said bumper into which the lower casing portion of a spare tire may be received, a tire mounting for supporting said tire in a generally vertical position in said recess and operable to shift the tire from a forward position with its inner side in juxtaposition to said lid to a rearward position permitting swing clearance for said lid and without removing the tire from said recess, said mounting comprising a hanger element including a base portion for rigidly securing said element to said body and a peg-like portion extending from said base portion between said body and said inner side of said tire and curved in the direction of its length, and a tire carrying member having an aperture for receiving said peg-like portion and movable on said peg-like portion along a path determined by the curvature of the latter, the said curvature having its focus within the casing section of the portion of the tire to be received in said recess.

5. In combination with a vehicle having a body including a rear compartment having an upwardly swingable lid and having a bumper structure spaced rearwardly of said body providing a recess between said body and bumper into which the traction casing of a spare tire may be received with one side of said tire in juxtaposition to said body, a mounting for said tire comprising a hanger including a base portion rigidly secured to said body below said lid and a peg-like element curved in the direction of its length and extending upwardly and outwardly from said base portion between said body and said inner side of said tire, and a tire carrying member having an aperture for receiving said element and to be carried thereby, said member being movable on said element along a path determined by the curvature of said element, the radius of said curvature being approximately the distance from the center of rotation of said tire to approximately a point in the mid region of the cross section of said traction casing of the tire whereby said tire may be moved from a forwardly inclined position in juxtaposition to said lid to a rearward position permitting swing clearance for said lid and while substantially retaining the lower traction portion of the casing in substantially the same spaced position relative to the body and bumper throughout the said movement of said tire.

6. In combination with a vehicle having a body including a compartment having an upwardly swingable lid and having a bumper structure spaced rearwardly of the body providing a recess between it and said bumper into which the lower portion of a spare tire may be received, a tire mounting for supporting said tire in a generally vertical position in said recess and operable for shifting the tire about its lower portion from a forward position with its inner side in juxtaposition to said lid to a rearward position permitting swing clearance for said lid and without removing the lower portion of said tire from said recess, said mounting comprising a hanger element adapted for attachment to said body below said lid, said hanger including a base portion and a tubular peg-like element extending upwardly and outwardly from said base portion between said body and said inner side of said tire, said tubular element being curved in the direction of its length, and a flanged tire carrying member having a tubular portion interengageable with said curved element and slidable thereon, said tubular portion having a curvature in the direction of its axis generally similar to that of said element and the curvature of said hanger element and tubular portion of said tire carrying member having its focus within the lower portion of said tire.

7. In combination with a vehicle having a body including a rear compartment having an upwardly swingable lid, a bumper structure spaced rearwardly of said body and a stone shield intermediate said body and bumper providing a recess into which the lower portion of a spare tire may be received and substantially fit with normal clearance, a tire mounting for supporting said tire in a generally vertical position in said recess and operable for shifting the tire about its lower portion from a forwardly inclined position with its inner side in juxtaposition to said lid to a rearward position permitting swing clearance for said lid and while substantially retaining the lower portion of the tire in the recess of said shield throughout the said movement of said tire, said mounting comprising a hanger including a base portion rigidly secured to the body below said lid and a peg-like element extending upwardly and outwardly from said base portion between said body and said inner side of said tire, said element defining a path of changing direction in the direction of its length, said path having its focus within said recess, a tire carrying member having a tubular portion received over said element and movable lengthwise thereon, said tubular portion having a shape in the direction of its axis generally similar to that of said element, guide means operable between said element and tubular portion for predetermining said lengthwise movement of said tubular portion, and clamping means operable between said element and tubular portion for holding said member in a predetermined position.

8. In combination with a vehicle having a body including a rear compartment having an upwardly swingable lid and having a bumper structure spaced rearwardly of said body providing a recess between it and said bumper into which the lower portion of a spare tire may be received, a tire mounting for supporting said tire in a generally vertical position in said recess and operable for shifting the tire about its lower portion from a forward position with its inner side in juxtaposition to said lid to a rearward position permitting swing clearance for said lid and while substantially retaining the lower portion of the tire in substantially the same spaced position relative to said body and bumper, a hanger including a base portion rigidly secured to said body below said lid and a peg-like element extending upwardly and outwardly from said base portion between said body and said inner side of said tire, said element being curved in the direction of its length and having its focus within said recess, a tire carrying member having a tubular portion received over said element and movable lengthwise thereon, said tubular portion having a curvature in the direction of its axis generally similar to that of said element, stop means for limiting movement of said member on said element, and releasable holding means operable between said element and tubular portion for holding said member in a predetermined position.

9. A spare tire mounting as claimed in claim 8 wherein said holding means comprises a pair of set screws.

10. In combination with a vehicle having a frame, a body including a rear compartment having an upwardly swingable lid and defined in part by a rear panel and a floor interiorly of said body and having a bumper structure spaced rearwardly of said body and providing a recess between it and said bumper within which the lower portion of a spare tire may be received, a tire mounting for supporting said tire in a generally vertical position in said recess and operable for shifting said tire from a forwardly inclined position with its inner side in juxtaposition to said lid to a rearward position permitting swing clearance for said lid and without removing the lower portion of said tire from said recess, said mounting comprising a hanger having a base portion secured to said rear panel and having a tubular peg-like element extending upwardly and outwardly from said base portion between said body and said inner side of said tire, said tubular element being curved in the direction of its length and said curvature having its focus within said recess, a stiffener bracket for said rear panel, an anchor member for said stiffener bracket, a flanged tire member having a tubular portion interengageable with said curved element and movable thereon, said tubular portion having a curvature in the direction lengthwise of its axis generally similar to that of said element and releasable means for holding said member in a predetermined position lengthwise of said element.

11. The combination as claimed in claim 10 wherein said holding means comprises a strap-type clamp.

12. The combination as claimed in claim 10 wherein said holding means comprises a pair of set screws spaced apart longitudinally and circumferentially of said tubular portion.

13. In a vehicle having a body and a bumper spaced rearwardly of the end thereof providing a recess between said body and bumper into which the lower end of a spare tire having a forward side and a rearward side may be received, a tire mounting for supporting said tire in a generally vertical position in said recess with its forward side in juxtaposition to said body and operable to shift said tire rearwardly to a second generally vertical position facilitating access to the rear end of said body without removing the tire from said recess, said mounting comprising a hanger element rigidly secured to said body and projecting rearwardly and upwardly therefrom between said body and said forward side of said tire, a tire carrying member supported by said hanger element and movable thereon away from said body, and arcuate means on one of said member and hanger element determining said movement of said tire carrying member and providing a path of changing direction therefor having its focus within said recess whereby to effect the aforesaid tire positioning.

References Cited in the file of this patent

UNITED STATES PATENTS

| | | |
|---|---|---|
| 1,524,896 | Wasserfallen | Feb. 3, 1925 |
| 1,541,382 | Pfennig et al. | June 9, 1925 |
| 1,687,749 | Borror | Oct. 16, 1928 |
| 1,982,568 | Boss | Nov. 27, 1934 |
| 2,015,422 | Ellenberger | Sept. 24, 1935 |
| 2,553,686 | Stromberg | May 22, 1951 |
| 2,711,273 | Stromberg | June 21, 1955 |